United States Patent
Hossepian (10) Patent No.: US 10,185,525 B1
(45) Date of Patent: Jan. 22, 2019

(54) SYSTEMS, PROCESSES, AND COMPUTER PROGRAM PRODUCTS FOR ASYMMETRIC IMPOSITION OF IMAGES ON PRINTING SHEETS

(71) Applicant: KYOCERA Document Solutions Inc., Osaka (JP)

(72) Inventor: Nishan Hossepian, Torrance, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 15/852,317

(22) Filed: Dec. 22, 2017

(51) Int. Cl.
*G06F 3/12* (2006.01)

(52) U.S. Cl.
CPC .......... *G06F 3/1242* (2013.01); *G06F 3/1211* (2013.01); *G06F 3/1252* (2013.01); *G06F 3/1286* (2013.01); *G06F 3/1287* (2013.01)

(58) Field of Classification Search
CPC .................................................... G06F 3/1242
USPC ........................................................ 358/1.18
See application file for complete search history.

(56) References Cited

U.S. PATENT DOCUMENTS

| | | | |
|---|---|---|---|
| 8,345,303 B2 | 1/2013 | Yoshimoto | |
| 9,116,648 B1 * | 8/2015 | Funderburg | G06F 3/1242 |
| 2002/0040375 A1 * | 4/2002 | Simon | G06T 11/60 |
| | | | 715/251 |
| 2014/0085645 A1 | 3/2014 | Okazaki | |

* cited by examiner

*Primary Examiner* — Jacky X Zheng
(74) *Attorney, Agent, or Firm* — Law Office of Alexis J. Saenz (57) ABSTRACT

A system and method provide efficiency in the placement of image objects onto a page space. Print jobs become more efficient in use of page space to minimize the amount of blank space left by maximizing the number of images per space available according to a process of defining columns and rows for each column. A column may be defined by the available image object with the largest width. Subsequent columns may be defined by the next objects with the next largest widths that fit within available page space. Once columns are defined, each column may define rows based on the image objects that maximize page space for each row. The process may reiterate for each column until no more image objects are available or the remaining available empty page space can no longer fit an object.

20 Claims, 4 Drawing Sheets

SYSTEMS, PROCESSES, AND COMPUTER PROGRAM PRODUCTS FOR ASYMMETRIC IMPOSITION OF IMAGES ON PRINTING SHEETS

CROSS-REFERENCE TO RELATED APPLICATION

None.

FIELD

The subject disclosure relates to image processing and more particularly to systems, processes, and computer program products for asymmetric imposition of images on printing sheets.

BACKGROUND

Some image forming apparatuses have a capability to print multiple pieces of pages/image files on one sheet, which enables users to save papers and processing time. However, conventional approaches to printing multiple print jobs onto one sheet are typically inefficient and unnecessarily waste page space. For example, in print projects that produce individually cut images from a print sheet, inefficiently positioned print jobs cause a lot of the paper to be wasted in the form of blank spaces. For some heavy stock paper such as photo quality sheets, this can be very expensive over several print jobs.

In digital applications, saved print projects that inefficiently position digital forms of images onto a single digital sheet waste data space on blank areas of an image sheet.

As can be seen, there is a need to improve on the efficiency of positioning print jobs onto print sheets.

SUMMARY

In one aspect of the disclosure, an automated method of positioning image content within a page space by a computer processor comprises retrieving from a memory storage device, a plurality of image objects to be printed onto a page space. A width and length of each image object may be determined from metadata. A size of each image object may be determined based on the width and length of each image object. A plurality of columns may be defined on the page space wherein, a width of a first of the plurality of columns is based on a width of an image object with the largest width and a width of a second of the plurality of columns is based on a width of an image object with the second largest width. The image object with the largest width may be positioned on the page space in the first of the plurality of columns. The image object with the second largest width may be positioned on the page space in the second of the plurality of columns. In addition, in a column by column process, members from the plurality of image objects may be positioned into as many rows available in each respective column, wherein a size of each row for each column is based on the determined lengths and widths of each image object.

In another aspect, an image processing apparatus comprises an image processing module configured to capture and process a plurality of image objects for printing onto a page space. A memory storage device is configured to store the plurality of image objects. In addition, a processor is in communication with the image processing module and the memory storage device. The processor may be configured by executable instructions to: retrieve from the memory storage device, a plurality of image objects to be printed onto a page space; determine from metadata of each image object, a width and length of each image object; determine a size of each image object based on the width and length of each image object; define a plurality of columns on the page space wherein, a width of a first of the plurality of columns is based on a width of an image object with the largest width, a width of a second of the plurality of columns is based on a width of an image object with the second largest width. The processor may be further configured to: position the image object with the largest width on the page space in the first of the plurality of columns; position the image object with the second largest width on the page space in the second of the plurality of columns; and in a column by column process, position members from the plurality of image objects into as many rows available in each respective column, wherein a size of each row for each column is based on the determined lengths and widths of each image object.

In yet another aspect, an automated method of positioning image content within a page space by a computer processor comprises retrieving from a memory storage device, a plurality of image objects to be printed onto a page space. A width and length of each image object may be determined from metadata. A size of each image object may be determined based on the width and length of each image object. A first column size for a first column of the page space may be determined based on the width of an image object with the largest width. The image object with the largest width among the plurality of image objects may be positioned within a first row of the first column of the page space. At least a second column size for at least a second column on the page space may be determined based on the widths of image objects with next largest widths from among the plurality of image objects. The image objects with the next largest widths from among the plurality of image objects may be positioned into at least the second column on the page space and into any remaining columns on the page space, on the condition that any of the image objects with the next largest widths fit into any remaining columns on the page space. A number of rows may be determined for the first column of the page space. A maximum number of the image objects may be determined that fit within the first row of the first column of the page space. Image objects that are not yet placed onto the page space may be identified, in a first instance, from the plurality of image objects. The maximum number of image objects that fit within the first row of the first column of page space may be positioned within the first row of the first column of the page space, in addition to the image object with the largest width. Image objects that are not yet placed onto the page space may be identified in a second instance, from the plurality of image objects. A maximum number of the image objects may be determined that are not yet placed onto the page space that fit within at least a second row of the first column of the page space and into any remaining rows available within the first column of the page space. The maximum number of the image objects that are not yet placed onto the page space that fit within at least the second row of the first column of the page space and into any remaining rows available within the first column of the page space may be positioned in the first column of the page space. A plurality of image objects that are not yet placed onto the page space may be identified, in a third instance. A maximum number of the image objects that are not yet placed onto the page space that fit within rows of the at least second column of the page space and into rows of any remaining columns of the page space may be recursively determined. The maximum number of the image objects that are not yet placed onto the page space that fit within rows of the at least second column of the page space and into rows of any remaining columns of the page space may be recursively positioned within rows of the at least second column of the page space and any remaining columns of the page space.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of image rendering and printing.

Generally, embodiments of the subject technology invention provide computer implemented methods that allow multiple print jobs of varying sizes to be laid out onto a page space to efficiently use the available printing area. As will be appreciated, aspects of the embodiments disclosed reduce waste of consumables for printing, such as recording mediums (paper, textiles, etc.) and reduce time for print job extraction. In some aspects, the methods may achieve positioning the maximum number of jobs possible on a given sheet for a set of print job objects while producing the minimum amount of waste. In addition, further efficiency is produced by positioning print job objects onto paper sheets (or other medium) so that full-length cuts can be made across the press sheet in order to extract multiple jobs from said sheet with a minimum number of cuts needed. As will be appreciated, providing full-length cuts across the sheet saves time by reducing the number of cuts needed.

As used below, a "page space" may refer to a sheet of paper or a digital representation of a sheet. Generally speaking, the "page space" may refer to the available printing area onto which images may be placed and fit within the borders for a size of paper. In some embodiments, the digital representation of the page space may exist as a digital file to be transferred between computing devices and displayed on an electronic display. The page space may in some embodiments exist as an electronic file whose display shows the positioning of image objects under the embodiments disclosed below or may be rendered onto a recording medium such as paper (or another tangible substrate onto which an image object may be rendered) as described further below. In addition, a "print job" may refer to a single image or a page with multiple images contained within its borders. As used below, a "print job" may sometimes be referred to as an image object since the rendering of the print job is shown as an image within the page space. As "print jobs" are requested, aspects of the embodiments disclosed may compile multiple "print jobs" into a single overall "print job" or "print project" laid out onto a sheet or series of connected sheets.

For the following flowchart, steps of the processes may be referred to as blocks and/or by reference numeral shown in parentheses. As will be described further below, steps may be performed by a machine, for example, a computing device, an image forming apparatus, and/or a processing unit. While the steps may be described in one order, it will be understood that variations to the order may be practiced or the order in which claims below are written may vary from the following without departing from the scope of the invention.

Figure 1:
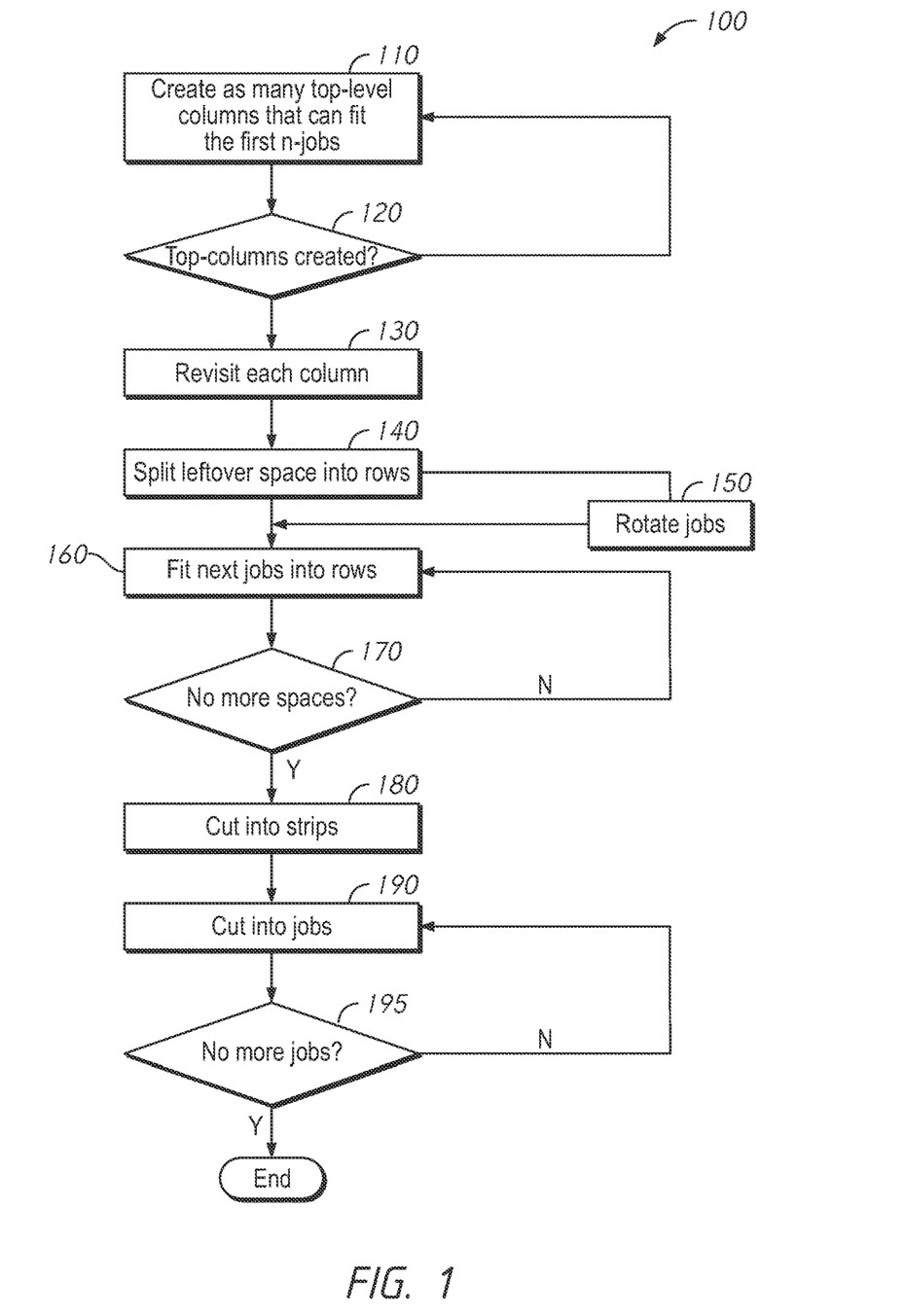
FIG. 1 is a flowchart of a method of positioning print job images within a page space in accordance with an embodiment of the subject technology.

Referring now to FIG. 1, a method 100 of positioning print jobs within a page/sheet is shown according to an exemplary embodiment. The method 100 may be applied to for example, a print job with a plurality of image objects that can share the page space. An example of a print job that implements aspects of the following method 100 may be seen in FIG. 2, which shows a page space 200 with image objects generally called out as numeral 220 (labeled by the nomenclature "Job #") positioned on the printable area of a medium. Blank or empty space is shown by cross-hatching and called out as numeral 225. For sake of illustration, only a single blank area 225 is called out however it will be understood that several blank areas 225 are shown based on the areas the image objects 220 do not occupy. In one aspect, the image objects are positioned to minimize the amount of area 225 on the page space 200. Each image object 220 represents a different print job request, however, the page space 200 with the plurality of image objects 220 laid out may represent an overall print job. However, it will be understood that an actual layout of print jobs depends on the size of each image object 220 and the number of image objects 220 used for the page space 200, which may vary from the layout of image objects 220 shown. It should be further understood that the image objects 220 may be different image files that may or may not be related to the same print project. Thus, for clarification, the image objects 220 may be called out with different subscripts (for example, 220a, 220b, etc.) to clearly identify one image object 220 from another. However, as will be appreciated, aspects of the embodiments disclosed allow system embodiments (FIG. 3), image forming apparatus embodiments (FIG. 4) and/or computing device embodiments (FIG. 5), to bank a plurality of image objects 220 (print job$_1$ ... print job$_n$) and determine from the bank, a group of print jobs that may maximize the use of page space 200. In addition, while some image objects 220 may by default have a portrait or landscape orientation, embodiments below may modify the orientation of any image object 220 to maximize use of the page space 200. Some embodiments may include an empty border space 230 around each image object 220 in determining the optimum positioning of image objects 220 on the page space 200. While border space 230 adds to the size of image objects 220 as well as to the complexity of maximizing page space usage, it will be appreciated, this may add to the quality of any finished extracted product for commercial end product purposes.

Figure 2:
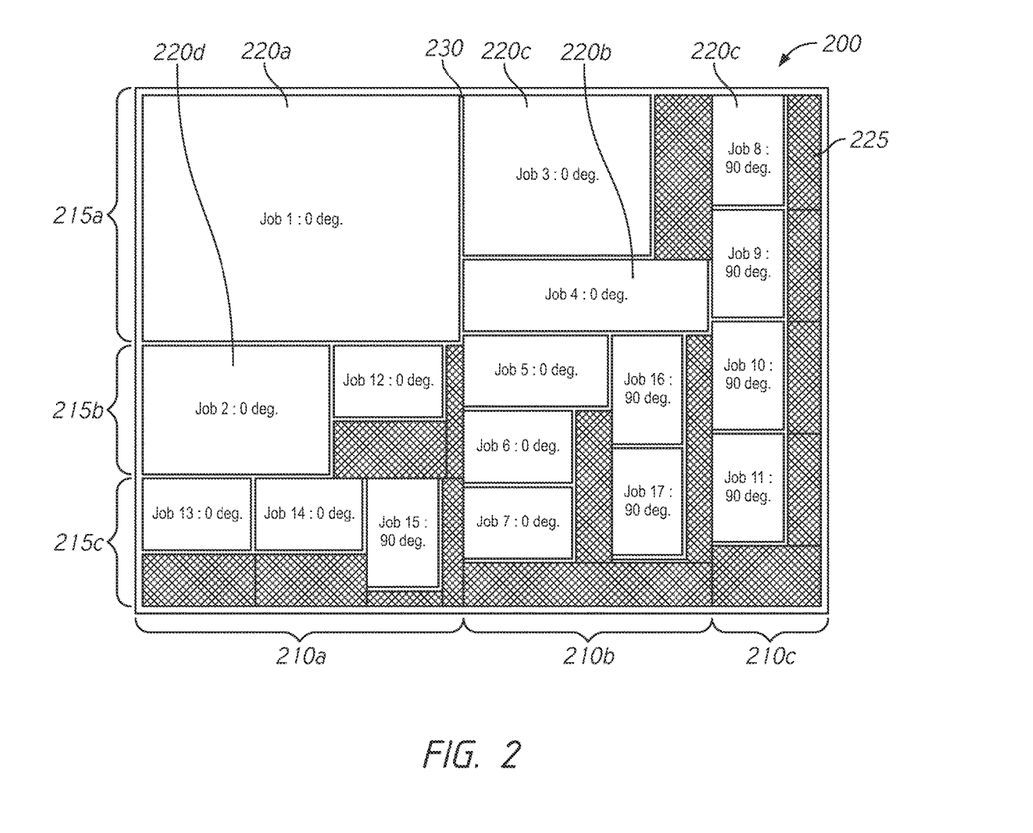
FIG. 2 is a diagram of a rendered page space with image objects positioned in accordance with embodiments of the subject technology.

Thus, for sake of illustration, the method 100 may be described with concurrent reference to FIG. 2 so that one may visualize one example of how the method 100 may efficiently lay out a bank of image objects 220 onto the page space.

Within a page space 200, the method 100 may begin by defining 110 as many top-level columns that can fit the first n-jobs from the job bank (not shown). In FIG. 2, columns are represented in general by features including the numeral 210. In the example shown, three columns 210 (210a, 210b, and 210n) are shown, however theoretically any number of columns 210 may occupy the page space 200 so long as the criteria for making a new column 210 remains available. To define the columns 210, a plurality of image objects 220 to be printed onto the page space 200 may be retrieved from a memory storage device (described in more detail in FIGS. 4 and/or 5). From the metadata of each image object 220, a width and length of each image object may be determined, which may be used to determine the overall size of each image object. The first column 210a may be defined by the width of an image object 220 with the largest width from among the plurality of image objects. In the illustrative scenario, image object 220a (labeled as "Job 1") is the image object with the largest width, and is thus used to define column 210a. Each subsequent column 210 may be defined by the image object 220 with the next largest width if the page space 200 has enough empty space available to accommodate another column. For example, after column 210a is defined, since unused page space remains to fit other image objects 220, the second column 210b is defined by the image object 220 with the second largest width from among the plurality of image objects that have not yet been positioned, which in the illustrated scenario is object 220b ("Job 4"). However, image objects 220c ("Job 3") and 220d ("Job 2") are the image objects with the next largest widths but the remaining unused page space to the right of column 210b does not have enough room to fit either of these image objects. Thus, the process finds the image object 220 with the next largest width that fits in the remaining unused page space and defines the last column according to the width of the next largest available object which fits (in the illustrated scenario, image object 220r, ("Job 8"). As may be appreciated, the selection of which image object 220 defines a column or is next positioned onto the page space 200 is irrespective of the queue order in which the print job is received. As described above, "Job 4" was positioned before either of "Job 2" and "Job 3".

The method may determine (120) whether the page space 200 has defined the maximum available number of columns until the page space no longer has room. In a column by column process, each image object 220 defining its respective column may be positioned digitally within the page space 200.

After the top-level columns 210 are created, the method 100 may then revisit (130) each column 210 for placement of image objects 220 until the column 210 space is maximized. For example, the method may demarcate ("split") (140) any unused page space 225 within the column 210 into rows 215 while attempting to fit the next n-jobs into said rows for said column. A size of each row 215 for each column 210 is based on the lengths and widths of each image object 220 that has not yet been positioned (or is not already designated for another column, for example, a column defining object) into the unused page space 225. In some embodiments, placement of the image objects 220 for a given row 215 may be based on which of the remaining print jobs provide the maximum number of image objects 220 for a given row 215. In placing the image objects 220 in a row 215, some embodiments may consider the fit of image objects 220 into the row 215 when their orientation is rotated (150), 90 degrees. Examples of such orientation modification and placement can be seen in job numbers 8-12 and 15 which indicate a 90-degree rotation. As can also be seen, this may result in having image objects 220 with both a landscape and a portrait orientation in the same row (for example, row 215n). The method may perform positioning of image objects 220 in the first column 210a until a first row is filled along the width of the column.

The process may continue fitting (160) a next group of image objects 220 into a next row 215b and reiterates the process of filling rows in the column 210a until there is no longer enough unused space 225 in column 210a to fit another row 215. As can be seen in column 210a, the length of the unused space 225 under Jobs 13 and 14 were not large enough to fit the length or width any of the remaining other image objects 220 in the page space 200 that were eventually fit into other columns 210b and 210n. The process of positioning image objects 220 into each column 210 may reiterate for each column in column-to-row subdivision until all print jobs have been placed and/or no more space is determined (170) to be left over to accommodate more jobs. Thus, as may be observed, some rows 215 have a single image object (for example row 215a has a single image object 220a) while other rows may have a plurality of image objects 220 in the same row.

As will be further appreciated, one aspect of the above steps in the method 100 provide for more efficient final extraction of the print jobs from the page space 200. In embodiments that use an image forming apparatus 400 (FIG. 4) that includes a cutting mechanism, the method 100 may include a step of cutting (180) the page space 200 into strips. Final jobs may be extracted (190) from a printed sheet by first making full vertical cuts, along each column 210 corresponding to the first level columnar layout. The cut strips may then be separated and full horizontal cuts may be made along each row 215 of the strip corresponding to the second level row layout. Each cut row 215 may then be cut for each image object 220 in the row 215 until all jobs have been cut out from the initial press sheet. As will be appreciated, when typically extracting print jobs of various sizes on the same sheet in arbitrary positions, there may need to be as much as four cuts per object under the related art. However, the method 100 saves several cuts by creating rows for each column based on the maximum number of objects that will fit into rows that can be made for the column, which allows for cuts to share the borders of image objects 220 fully along the length of the sheet and to share borders along the width of cut out strips. Once the process determines (195) that no more print jobs are left to extract, the process may terminate for the page space.

Figure 3:
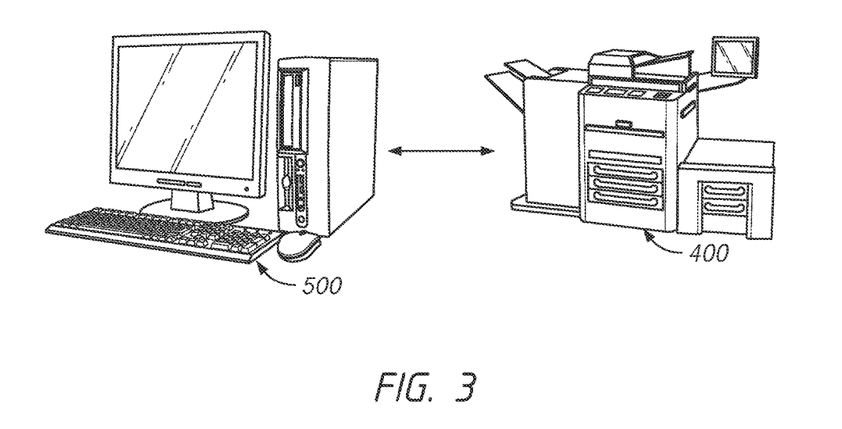
FIG. 3 is a schematic of a print job system in accordance with an embodiment of the subject technology.
Figure 4:
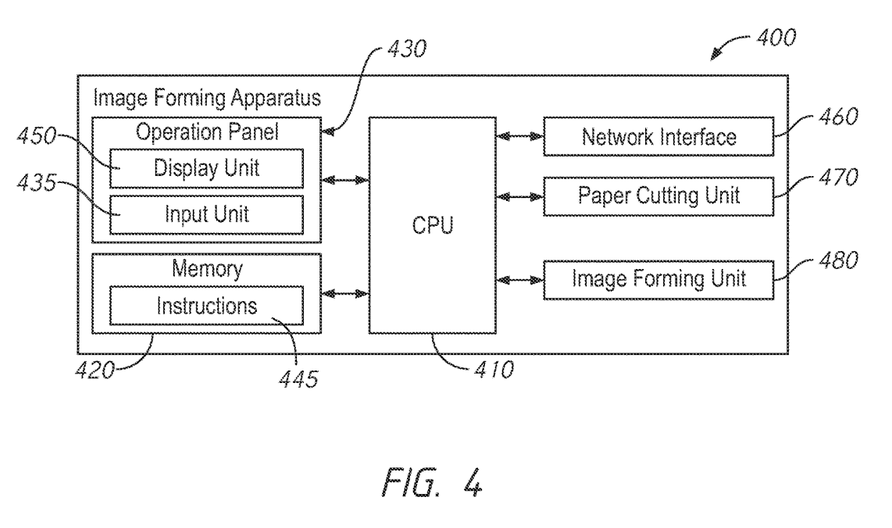
FIG. 4 is a block diagram of an image forming apparatus in accordance with an embodiment of the subject technology.
Figure 5:
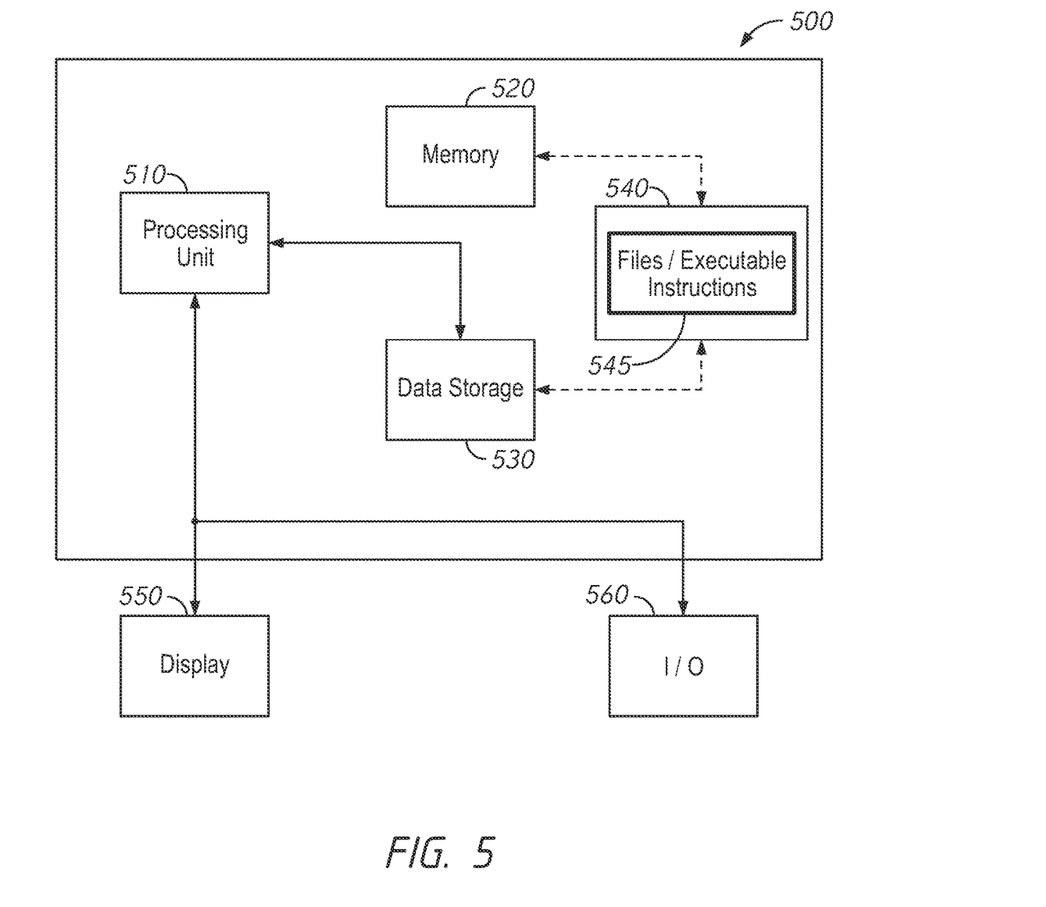
FIG. 5 is a block diagram of a computing device in accordance with an aspect of the subject technology.

Referring now to FIGS. 3-5, system and machines of the subject technology are shown according to exemplary embodiments. A system 300 is shown in FIG. 3 which may include an image forming apparatus 400 connected to a computing device 500. In some embodiments, the above described process(es) may be loaded as executable instructions into one or both of the image forming apparatus 400 and the computing device 500. FIG. 4 shows a schematic example of the image forming apparatus 400. FIG. 5 shows a schematic example of a computing device 500. In general, the process(es) above may be implemented by either or both the image forming apparatus 400 and the computing device 500. In addition, it will be understood that multiple instances of the computing device 500 may be connected to the same image forming apparatus 400, however, for sake of illustration, a single computing device 500 is shown. In an exemplary operation, a computing device(s) 500 may send multiple print jobs to the image forming apparatus 400. In one embodiment, the print jobs may be received serially on a first come, first serve basis. Rather than print and cut each print job individually or position each print job onto a printing sheet in the order of arrival, the process(es) described above may be used to bank a plurality of print jobs and position print jobs onto a print sheet for maximum use of page space and/or cutting efficiency. As new print jobs are received, the process may refresh the current bank of jobs so that the page space may be continually maximized based on the content of the job bank. The process may wait until new jobs arrive to maximize the used page space before finalizing a print layout. Some embodiments may include a user override feature that may finalize a page space layout of print jobs for printing before preventing any additional jobs from being added to the page space. As will be appreciated, this may prevent unrelated print jobs of a particular user's print project from being included in the page layout and subsequent extraction. In some embodiments, the image forming apparatus 400 and/or the computing device 500 may include software embodiments, which may provide a digital preview of a print sheet with print jobs laid out according to the embodiments described herein. The preview may be saved as a file which may be stored, transferred, and recalled for future print requests.

The image forming apparatus 400 may be for example, a computing based image processing and printing device that can receive print job requests (for example, a printer, a fax machine, a copier machine). The components of the image forming apparatus 400, may include, but are not limited to, one or more processors or processing units 410, a system memory 420, an operation panel 430, an input unit 435, a set of program modules 445 including files and executable instructions, a display unit 450, a network interface 460, a paper cutting unit 470, an image forming unit 480, and a bus system that couples various system components including the system memory 420 to the processor(s) 410. The memory storage 420 may store for example, executable instructions and/or electronic versions of the image objects to be printed. In some embodiments, the processors 410 may include a processing unit dedicated to graphics and image processing (for example a graphics processing unit (GPU) or visual processing unit (VPU). As a GPU or VPU, the processor 410 may implement executable instructions focused on image processing applications (like those related to rendering the image objects into print jobs on the page space described above) either alone or in coordination with other general processor 410 types such a CPUs, microchips, and the like.

The computing device 500 may be for example, a computer system or a computer server. In some embodiments, the image forming apparatus 400 may be another example of a computing device 500. As will be appreciated, some aspects of the embodiments disclosed above may turn the computing device 500 into a special purpose computer system. For example, in the role of a host server, the computing device 500 may implement for example the functions of storing electronic image object files with connected users and their workstations. More particular to this disclosure, as a host server, the computing device 500 may receive and store print job requests of image objects from various computing workstations and coordinate the positioning of image objects onto a print sheet according to the process(es) described above. In the role of a user device, the computing device 500 is generally not a server but may instead be desktop computers, tablet or laptop computers, all-in-one computer stations, a mobile computing device (for example, a smart phone, smart wearable devices (glasses, jewelry, watches, ear wear, etc.), or programmable electronics.

The components of the tablet or laptop computers, may include, but are not limited to, one or more processors or processing units 510, a system memory 520, data storage 530, a computer program product 540 having a set of program modules 545 including files and executable instructions, and a bus system that couples various system components including the system memory 520 to the processor(s) 510. The memory storage 520 may store for example, electronic files of the image objects to be printed. In some embodiments, the processors 510 may include a processing unit dedicated to graphics and image processing (for example a graphics processing unit (GPU) or visual processing unit (VPU). As a GPU or VPU, the processor 510 may implement executable instructions focused on image processing applications (like those related to converting unrendered image content data described above) either alone or in coordination with other general processor 510 types such a CPUs, microchips, and the like.

The computing device 500 may be described in the general context of computer system executable instructions, such as the program modules 545 which represent a software embodiment of the system and processes described generally above with respect to FIGS. 1 and 2. The program modules 545 generally carry out the functions and/or methodologies of embodiments as described above. The computing device 500 may typically include a variety of computer system readable media. Such media could be chosen from any available media that is accessible by the computing device 500, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 520 could include one or more computer system readable media in the form of volatile memory, such as a random-access memory (RAM) and/or a cache memory. By way of example only, the data storage system 530 may read from and write to a non-removable, non-volatile magnetic media device. The system memory 520 may include at least one program product 540 having a set (e.g., at least one) of program modules 545 that are configured to carry out the functions of embodiments of the invention in the form of computer executable instructions. The program product/utility 540, having a set (at least one) of program modules 545, may be stored in the system memory 520 by way of example, and not limitation, as an operating system, one or more application programs, other program modules, and program data. Some embodiments may generate an electronic user interface (viewable and controllable from the display unit 450 or display 550) that may allow the user to enter image objects for processing and in some embodiments, control and manipulate the positioning of image objects onto a print sheet (even though embodiments are generally considered automated and positioning may primarily be performed by the processing unit(s) 410 and/or 510).

The computing device 500 may communicate with one or more external devices including for example, an electronic display 550 which may in some embodiments be configured for tactile response as in a touch screen display. User input into the display 550 may be registered at the processor 510 and processed accordingly. Other devices may enable the computing device 500 to communicate with one or more other computing devices, either by hardwire or wirelessly. Such communication can occur via Input/Output (I/O) interfaces/ports 560. In some embodiments, the I/O interfaces/ports 560 may be specially configured to handle aspects of the embodiments described herein converting the computing device 500 into a special purpose machine. For example, as a printer, the I/O interfaces/ports 560 may be configured to transmit receipt of the image objects with their respective metadata for use in determining optimum positioning on a page space. The printer may be dedicated to printing and cutting jobs. The I/O interfaces/ports 560 may also include printing modules (for example, ink jet print heads, laser print systems, etc.) for rendering a physical embodiment of page sheet with image objects optimally positioned on the page space.

The computing device 500, through the I/O interface/ports 560, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 500 may be a cloud computing node connected to a cloud computing network (not shown). The computer computing device 500 may be practiced in distributed cloud computing environments where tasks are performed by remote processing devices that are linked through a communications network. In a distributed cloud computing environment, program modules may be located in both local and remote computer system storage media including memory storage devices. Thus, members contributing to for example, the overall system being developed described above may provide software modules to the computing device 500 which may hold electronic files and copies in more than one physical location, each of which may be referenced and/or may trigger automated processes (for example, once a threshold number of print job requests are received).

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 550 which may be controlled via direct contact with the display 550 or via the I/O interfaces 560 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 510 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of positioning image content within a page space by a computer processor, comprising:
    retrieving from a memory storage device, a plurality of image objects to be printed onto a page space;
    determining from metadata of each image object, a width and length of each image object;
    determining a size of each image object based on the width and length of each image object;
    defining a plurality of columns on the page space wherein,
        a width of a first of the plurality of columns is based on a width of an image object with the largest width from among the plurality of image objects,
        a width of a second of the plurality of columns is based on a width of an image object with the second largest width from among the plurality of image objects, and
        positioning the image object with the largest width on the page space in the first of the plurality of columns;
    positioning the image object with the second largest width on the page space in the second of the plurality of columns;
    in a column by column process, positioning members from the plurality of image objects into as many rows available in each respective column, wherein a size of each row for each column is based on the determined lengths and widths of each image object; and
    outputting, a printed paper or a digital copy of the page space, with the plurality of image objects positioned within the plurality of columns to maximize use of the page space.

2. The method of claim 1, further comprising determining a maximum number of the plurality of image objects that will fit within each row of each column.

3. The method of claim 2, wherein determining the maximum number of the plurality of image objects that will fit within each row further comprises rotating image objects from a default orientation to fit within one or more rows within respective columns.

4. The method of claim 1, wherein within one of the plurality of columns, at least one row includes more than one of the image objects.

5. The method of claim 1, further comprising including a blank border space between each column and each row on the page space.

6. The method of claim 5, wherein defining the plurality of columns includes determining a maximum number of columns based on the image objects with the largest widths plus the blank border space between each column all fitting onto the page space.

7. The method of claim 1, wherein a first image object of a given row has a portrait orientation and a second image object of the given row has a landscape orientation.

8. The method of claim 1, wherein a last of the plurality of columns is defined by page space leftover by any of preceding defined columns and still has room for a remaining, un-positioned one of the plurality of image objects.

9. The method of claim 1, wherein
    a width of any additional columns of the plurality of columns is based on an image object(s) with a next largest available width; and
    positioning the image object(s) with the next largest available width on the page space of the any additional columns until every column on the page space includes one of the plurality of image objects.

10. An image processing apparatus, comprising:
    a memory storage device configured to store a plurality of image objects; and
    a processor in communication with the memory storage device, wherein the processor is configured by executable instructions to:
    retrieve from the memory storage device, the plurality of image objects;
    determine from metadata of each image object, a width and length of each image object;
    determine a size of each image object based on the width and length of each image object;
    define a plurality of columns on a page space wherein,
        a width of a first of the plurality of columns is based on a width of an image object with the largest width from among the plurality of image objects,
        a width of a second of the plurality of columns is based on a width of an image object with the second largest width from among the plurality of image objects, and
        position the image object with the largest width on the page space in the first of the plurality of columns;
    position the image object with the second largest width on the page space in the second of the plurality of columns;
    in a column by column process, position members from the plurality of image objects into as many rows available in each respective column, wherein a size of each row for each column is based on the determined lengths and widths of each image object; and
    output, a printed paper or a digital copy of the page space, with the plurality of image objects positioned within the plurality of columns to maximize use of the page space.

11. The apparatus of claim 10, wherein the processor is further configured to determine a maximum number of the plurality of image objects that will fit within each row of each column.

12. The apparatus of claim 11, wherein determining the maximum number of the plurality of image objects that will fit within each row further comprises rotating image objects from a default orientation to fit within one or more rows within respective columns.

13. The apparatus of claim 10, wherein within one of the plurality of columns, at least one row includes more than one of the image objects.

14. The apparatus of claim 10, wherein the processor is further configured to include a blank border space between each column and each row on the page space.

15. The apparatus of claim 14, wherein defining the plurality of columns includes the processor being further configured to determine a maximum number of columns based on the image objects with the largest widths plus the blank border space between each column all fitting onto the page space.

16. The apparatus of claim 10, wherein a first image object of a given row has a portrait orientation and a second image object of the given has a landscape orientation.

17. A method of positioning image content within a page space by a computer processor, comprising:
  retrieving from a memory storage device, a plurality of image objects to be printed onto a page space;
  determining from metadata of each image object, a width and length of each image object;
  determining a size of each image object based on the width and length of each image object;
  determining a first column size for a first column of the page space based on the width of an image object with the largest width among the plurality of image objects;
  positioning the image object with the largest width among the plurality of image objects, within a first row of the first column of the page space;
  determining at least a second column size for at least a second column on the page sp ace based on the widths of image objects with next largest widths from among the plurality of image objects;
  positioning the image objects with the next largest widths from among the plurality of image objects into at least the second column on the page space and into any remaining columns on the page space, on the condition that any of the image objects with the next largest widths fit into any remaining columns on the page space;
  determining a number of rows for the first column of the page space;
  determining a maximum number of the image objects that fit within the first row of the first column of the page space;
  identifying, in a first instance, from the plurality of image objects, image objects that are not yet placed onto the page space;
  positioning within the first row of the first column of the page space, the maximum number of image objects that fit within the first row of the first column of page space in addition to the image object with the largest width;
  identifying, in a second instance, from the plurality of image objects, image objects that are not yet placed onto the page space;
  determining a maximum number of the image objects that are not yet placed onto the page space that fit within at least a second row of the first column of the page space and into any remaining rows available within the first column of the page space;
  positioning within the at least second row of the first column of the page space, the maximum number of the image objects that are not yet placed onto the page space that fit within at least the second row of the first column of the page space and into any remaining rows available within the first column of the page space;
  identifying, in a third instance, from the plurality of image objects, image objects that are not yet placed onto the page space;
  recursively determining a maximum number of the image objects that are not yet placed onto the page space that fit within rows of the at least second column of the page space and into rows of any remaining columns of the page space;
  recursively positioning within rows of the at least second column of the page space and any remaining columns of the page space, the maximum number of the image objects that are not yet placed onto the page space that fit within rows of the at least second column of the page space and into rows of any remaining columns of the page space; and
  outputting a printed paper or a digital copy of the page space with the plurality of image objects positioned within the plurality of columns to maximize use of the page space.

18. The method of claim 17, wherein determining the maximum number of the image objects that fit within the first row of the first column of the page space further comprises rotating image objects from a default orientation to fit within one or more rows within respective columns.

19. The method of claim 17, wherein a last of the plurality of columns is defined by page space leftover by any of preceding defined columns and still has room for a remaining, un-positioned one of the plurality of image objects.

20. The method of claim 17, wherein determining the column size for any of the columns includes determining a maximum number of columns based on the image objects with the largest widths plus the blank border space between each column all fitting onto the page space.

\* \* \* \* \*